(12) United States Patent
Fox et al.

(10) Patent No.: US 8,801,957 B2
(45) Date of Patent: Aug. 12, 2014

(54) NANOPARTICLE ENHANCED IONIC LIQUID HEAT TRANSFER FLUIDS

(75) Inventors: Elise B. Fox, Aiken, SC (US); Ann E. Visser, Aiken, SC (US); Nicholas J. Bridges, Aiken, SC (US); Joshua R. Gray, Aiken, SC (US); Brenda L. Garcia-Diaz, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 124 days.

(21) Appl. No.: 13/234,284

(22) Filed: Sep. 16, 2011

(65) Prior Publication Data
US 2013/0068994 A1 Mar. 21, 2013

(51) Int. Cl.
*C09K 5/00* (2006.01)
(52) U.S. Cl.
USPC ............ 252/73; 252/74; 252/75; 252/76
(58) Field of Classification Search
USPC ............................................. 252/73
See application file for complete search history.

(56) References Cited

U.S. PATENT DOCUMENTS

2008/0302998 A1* 12/2008 Hong et al. .............. 252/74

OTHER PUBLICATIONS

W. Yu, D. M France, S.U.S. Choi, and J.L. Routbort, "Review and Assessment of Nanofluid Technology For Transportation and Other Applications"; Report from Argonne National Laboratory, Energy Systems Division, ANL/ESD/07-9; Apr. 2007; pp. 1-75.

* cited by examiner

*Primary Examiner* — Necholus Ogden, Jr.
(74) *Attorney, Agent, or Firm* — Dority & Manning, P.A.

(57) ABSTRACT

A heat transfer fluid created from nanoparticles that are dispersed into an ionic liquid is provided. Small volumes of nanoparticles are created from e.g., metals or metal oxides and/or alloys of such materials are dispersed into ionic liquids to create a heat transfer fluid. The nanoparticles can be dispersed directly into the ionic liquid during nanoparticle formation or the nanoparticles can be formed and then, in a subsequent step, dispersed into the ionic liquid using e.g., agitation.

22 Claims, 5 Drawing Sheets

NANOPARTICLE ENHANCED IONIC LIQUID HEAT TRANSFER FLUIDS

SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

The subject matter of the present invention relates to heat transfer fluids containing nanoparticles dispersed into ionic liquid carriers.

BACKGROUND OF THE INVENTION

From manufacturing to power generation and more, heat transfer fluids are necessary to a wide variety of processes as a means of cooling and/or heating by the transfer of energy using both thermal conduction with the fluid and movement of the fluid between a heat source and a heat sink. Typically, one or more heat exchangers within a heat exchange system are used for the transfer of heat to and from the heat transfer fluid. The efficiency and capacity of a heat exchange system can be improved upon by e.g., increasing the velocity of the heat transfer fluid within the system and/or increasing the surface area available for heat transfer. Unfortunately, such steps generally come at increased operating and/or equipment expense and may be impractical as a retrofit of an existing heat exchange system.

The identity of the component(s) used as the heat transfer fluid will also affect heat exchange. Typically, a heat transfer fluid having increased thermal conductivity and/or increased heat capacity can improve the efficiency and capacity of a heat exchange system. However, it also preferable that the heat transfer fluid remain stable at high temperatures, exhibit Newtonian flow, have a low volatility, and demonstrate compatibility with the materials used in the construction of the system. Unfortunately, heat transfer fluids that are currently in widespread use (e.g., water, ethylene glycol, engine oil) do not necessarily possess all of these desirable properties.

The thermal conductivities of solids are typically much higher than conventional heat transfer fluids such as water or oil. For example, the thermal conductivity of copper at room temperature is approximately 700 times higher than water. Accordingly, the dispersion of certain solids into a conventional heat transfer fluid has been investigated. Carbon nanoparticles dispersed into conventional heat transfer fluids such as ethylene glycol or mixtures of ethylene glycol and water are indicated in U.S. Pat. No. 6,695,974. The efficiency of the these mixtures as heat transfer fluids is, however, still limited by the relatively low thermal conductivity and/or heat capacity of water and ethylene glycol.

Accordingly, a need still exists for heat transfer fluids having improved efficiencies and capacities. More specifically, a need still exists for heat transfer fluids having relatively larger heat capacities and higher thermal conductivities that remain stable at higher temperatures, exhibit low volatility, transport with Newtonian flow, and are compatible with the materials used in modern heat exchange systems.

BRIEF DESCRIPTION OF THE INVENTION

Aspects and advantages of the invention will be set forth in part in the following description, or may be obvious from the description, or may be learned through practice of the invention.

In one exemplary embodiment, the present invention provides a heat transfer fluid that includes an ionic liquid and nanoparticles dispersed in the ionic liquid. The nanoparticles are made from one or more inorganic metal oxides. For example, the nanoparticles could be selected from the group consisting of alkali metal oxides, alkaline earth metal oxides, transition metal oxides, and combinations thereof.

The ionic liquid can include a cation selected from a heterocyclic compound having at least one positively charged nitrogen in its ring and an alkyl group that has replaced at least one hydrogen atom on any atom in the ring of the heterocyclic compound. The ionic liquid could also include a cation selected from a quaternary ammonium compound where the nitrogen is bonded to at least one alkyl group.

These and other features, aspects and advantages of the present invention will become better understood with reference to the following description and appended claims.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

A plot of the viscosity versus weight percentage of certain nanoparticles dispersed in an ionic liquid is provided in FIG. 4.

A plot of specific heat capacity versus temperature for a reference liquid and for NEILs constructed from different types of nanoparticles is provided in FIG. 5.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

DEFINITIONS

As used herein, the following definitions apply:

"Alkyl" refers to monovalent saturated aliphatic hydrocarbon groups having from 1 or more carbon atoms.

"Ionic liquid(s)" refers to an organic substance composed of cations and anions that is a liquid at about 100° C. or less and is capable of suspending nanoparticles.

"Specific heat capacity" refers to the heat required to raise a unit mass of a substance by one degree of temperature and may be reported, for example, in units of Joules per gram Kelvin or J/g K.

"Volumetric heat capacity" refers to the heat required to raise a unit volume of a substance by one degree of temperature and may be reported, for example, in units of Joules per milliliter Kelvin or J/ml K.

DETAILED DESCRIPTION

It is to be understood by one of ordinary skill in the art that the present discussion is a description of exemplary embodiments only, and is not intended as limiting the broader aspects of the present invention.

The present invention provides a heat transfer fluid created from nanoparticles that are dispersed into an ionic liquid. More particularly, small volumes of nanoparticles created from e.g., metals or metal oxides and/or alloys of such materials are dispersed into ionic liquids to create a heat transfer fluid. The nanoparticles can be dispersed directly into the ionic liquid during nanoparticle formation or the nanoparticles can be formed and then, in a subsequent step, dispersed into the ionic liquid using e.g., agitation. Oxides of metalloids may also be used for the nanoparticles as well.

The inventors have discovered that applied as a heat transfer fluid, these nanoparticle enhanced ionic liquids (NEILs) have an improved heat capacity, improved thermal conductivity relative to conventional heat transfer fluids or to the ionic liquid alone, and have thermal stability at relatively high temperatures. Such NEILs are chemically compatible with commercial stainless steels and aluminum and have a relatively low vapor pressure, low viscosity, and low freezing point. Different ionic liquids can be selected to provide different base values in e.g., heat capacity, thermal stability, thermal conductivity, and viscosity with substantial increases in heat capacity and thermal conductivity achieved through the addition of certain nanoparticles.

NEILs of the present invention may be used in a variety of heat transfer applications. By way of example, in one exemplary embodiment, the present invention includes a loop for circulation of a NEILs used as a heat transfer fluid. The loop provides circulation of the NEILs between a heat sink where energy is dissipated and a heat source where energy is transferred to the NEILs. A heat exchanger is used at the heat sink, heat source, or both.

The nanoparticles for the NEILs can be created from a variety of different substances. Such substances must be amenable to manufacturing as nanoparticles and must be capable of dispersion into the ionic liquid carrier. Preferably, the nanoparticles remain suspended in the ionic liquid carrier for time periods adequate for industrial use so that settling does not occur where the heat transfer fluid may be stationary over certain periods of time. In addition, the nanoparticle should be selected so as to improve the thermal conductivity and heat capacity of ionic liquid when added to it.

In general, without intending to be limited by theory, it is believed that heat transfer may take place at the surface of the particle and that such transfer is enhanced due to the extremely large surface area of a nanoparticle relative to its size as a higher percentage of atoms are available at the surface of the particle for thermal interaction. In addition, the use of nanoparticles as opposed to e.g., microparticles, may further improve the ability of the particle to suspend in the ionic liquid carrier and thereby avoid undesirable settling out during use.

Accordingly, in certain exemplary embodiments of the present invention, the nanoparticles used for dispersion in an ionic liquid have at least one dimension less than about 100 nanometers. In still other exemplary embodiments, the nanoparticles of the present invention may have at least one dimension less than about 50 nanometers (nm).

A variety of techniques can be used for creation of the nanoparticles. By way of example, dry nanoparticles can be produced by inert gas condensation where a source material is evaporated and the resulting vapor is rapidly condensed into nanometer sized crystallites or loose agglomerations in a reduced pressure atmosphere of a relatively cool inert gas. Alternatively, a solution-spray conversion process can be used starting with a solution containing water soluble source material. The solution is converted to an aerosol that is spray dried to create a powder. This powder is placed into a fluidized bed reactor in order to pyrolize the mixture, remove volatiles, and yield relatively fine powders. By way of further example, nanoparticles may also be created through condensation of metal vapors occurring during their rapid expansion through a supersonic nozzle.

Inorganic metal oxides are used for the source material of the nanoparticles. For example, the nanoparticles can be made from certain metals, metal oxides, and oxides of metalloids. Alloys of such materials may also be used for the nanoparticles.

The metal oxides that can be used for the creation of the nanoparticles include alkali metal oxides. For example, in certain exemplary embodiments of the present invention, the metal oxide may be selected from the following substances as well as alloys of these substances:

$Li_2O$ $K_2O$ $Rb_2O$ $Na_2O$ $Cs_2O$

Additionally, nanoparticles for use in NEILs of the present invention may also be selected from alkaline earth metal oxides. For example, in certain exemplary embodiments of the present invention, the metal oxide may be selected from the following substances as well as alloys of these substances:

BeO MgO CaO SrO BaO RaO

In still other exemplary embodiments of the present invention, transition metals as well as transition metal oxides may also be used for creation of the nanoparticles to be dispersed in the ionic liquid carrier. Noble metals and lanthanides may be used as well. For example, in certain exemplary embodiments of the present invention, the following substances as well as alloys of these substances may be used:

$Al_2O_3$ CuO $TiO_2$ $Fe_2O_3$ Au Ag Cu

Additionally, oxides of certain metalloids may also be used for the creation of the nanoparticles used for NEILs of the present invention. By way of example, in certain exemplary embodiments of the present invention, $SiO_2$ may be used for creation of the nanoparticles. Also, lanthanide oxides may also be used in certain exemplary embodiments of the present invention.

It should also be understood that combinations and/or alloys of the above identified substances may be used as nanoparticles for the creation of NEILs for use as heat transfer fluids of the present invention.

Preferably, in certain exemplary embodiments of the present invention, the weight percent of nanoparticles in the ionic liquid is less than about 10 percent. In still other embodiments, the weight percent of nanoparticles in the ionic liquid is less than about 5 percent. For still other exemplary embodiments of the present invention, the weight percent of nanoparticles in the ionic liquid is less than about 3 percent.

Ionic liquids are used as the liquid carrier for suspension of the nanoparticles to create the NEILs of the present invention. The ionic liquid for a particular application is selected for nanoparticle enhancement based in part on the liquid's base heat transfer properties including its heat capacity and thermal conductivity. While the heat transfer and thermodynamic properties of ionic liquids are the subject of continued investigation, a variety of such substances have already shown useful for nanoparticle enhancement and use as a heat transfer fluid. Additionally, it is believed these ionic liquids can be tailored for particular applications.

In certain exemplary embodiments, the ionic liquids can be selected from heterocyclic compounds having at least one positively charged nitrogen in the ring and at least one hydrogen atom on any ring atom that has been replaced with an alkyl group. By way of example, ionic liquids of the present invention can include complexes of the imidazolium cation and another anion. The imidazolium cation, for example, may be selected from the following cations:

wherein $R_n$ is an alkyl group of n carbon atoms and n=1, 2, 3, 4, 5, 6 or greater. Different values of n may be used for the different alkyl groups on the ring. The value of n will affect the values of the ionic liquid base heat transfer properties and, therefore, may be selected based on the particular application intended. By way of example, the imidazolium cation may be selected from the following:

1-butyl-2,3-dimethylimidazolium 1-hexyl-2,3-dimethylimidazolium

Continuing with a description of exemplary embodiments, the imidazolium cation, for example, may also be selected from the following cations:

wherein $R_n$ is an alkyl group of n carbon atoms and n is an integer equal to 1, 2, 3, 4, 5, 6 or greater. Different values of n may be used for the different alkyl groups on the ring. As stated above, the value of n will affect the values of the ionic liquid base heat transfer properties and, therefore, may be selected based on the particular application intended. These cations may also be represented as $[C_n mim]$ where n=1, 2, 3, 4, 5, 6 or greater. So, for example, the imidazolium cation may also be selected from the following:

1-butyl-3-methylimidazolium 1-hexyl-3-methylimidazolium

For certain exemplary embodiments, the anion can be selected from the following anions:

bis(trifluoromethylsulfonyl)imide bis(perfluoroethylsulfonyl)imide

The bis(trifluoromethylsulfonyl)imide anion may also be represented herein as $[NTf_2]$. The bis(perfluoromethylsulfonyl) imide anion may be represented herein as [BETI]. Other anions that may be used include, by way of example, $PF_6$, $BF_4$, triflate, halides, nitrates, alkyl sulfates, and others as well.

Accordingly, and by way of example only, ionic liquids based on the following complexes may be selected for use in certain exemplary embodiments, the present invention:

Other combinations of these ions as well as combinations with additional ions may be used as well.

Ionic liquids of the present invention can also be selected from ion complexes where the cation contains a quaternary ammonium where the nitrogen is bonded to at least one alkyl group. By way of example, the cation for the ionic liquid may be selected from one of the following cations:

where $R_n$ is an alkyl group of n carbon atoms and n is an integer equal to 1, 2, 3, 4, 5, 6 or greater, or
where $R_n$ is an alkyl group of n carbon atoms and n is an integer equal to 1, 2, 3, 4, 5, 6 or greater and also contains a functional group; and,
$R_{H/R1}$ is either a hydrogen (H) or a methyl group ($CH_3$).

As such, in certain exemplary embodiments, the cation for the ionic liquid may be selected from one of the following cations for example:

Accordingly, and by way of example only, ionic liquids based on the following complexes may be selected for use in certain exemplary embodiments of the present invention:

The above ionic liquids, including the various cations and anions described, are provided by way of example only. Using the teachings disclosed herein, one of skill in the art will understand that ionic liquids containing complexes of other cations and anions may also be used with the present invention.

Thermal Stability

Samples of the ionic liquids with and without nanoparticles were tested for thermal stability. Therminol VP-1, a commercially available heat transfer fluid from Solutia, Inc. of 575 Maryville Centre Dr., St. Louis, Mo. 63141, was used as a reference fluid. NEILs were created using nanoparticles dispersed in the ionic liquid [C4mmim][$NTf_2$], obtained from Ionic Liquid Technologies, Inc., 720 2nd Street, Tuscaloosa, Ala. 35401. The nanoparticles tested included nanoparticles of aluminum oxide ($Al_2O_3$) obtained from Sigma-Aldrich, 3050 Spruce St. Louis, Mo. 63103 and nanoparticles of carbon black (CB) obtained as Ketjen black from BASF of 38 Ludwigshafen AM, Federal Republic of Germany 67056. The carbon black nanoparticles had at least one dimension that was about 4 nm while the aluminum oxide nanoparticles had at least one dimension that was about 50 nm. All NEILs were prepared based on a weight percentage. The weighed materials were added together in a glass vial and shaken with a vortex mixer for 15 minutes on a medium-high setting. In most cases, the ionic nature of the ionic liquid was sufficient to suspend the nanoparticles for the test period.

Table I provides the results of thermal stability testing where "IL" references the base ionic liquid of [C4mmim][$NTf_2$]. Each sample was subjected to thermal stability testing at heating rates of 10 and 20° C. per minute. Proteus® software was used to calculate the thermal onset temperature. The results in Table I provide the temperature at which 5 weight percent of the original sample has been lost.

TABLE I

| | Proteus Cal. Onset (° C.) | 5 $_{wt.}$ wt. lost (° C.) |
|---|---|---|
| VP-1 10° C./min | 168 | 125 |
| VP-1 20° C./min | 181 | 133 |
| IL 10° C./min | 459 | 430 |
| IL 20° C./min | 464 | 443 |
| IL w/0.5 $_{wt.}$ % $Al_2O_3$ 10° C./min | 447 | 420 |
| IL w/0.5 $_{wt.}$ % $Al_2O_3$ 20° C./min | 464 | 445 |
| IL w/1.0 $_{wt.}$ % $Al_2O_3$ 10° C./min | 438 | 422 |
| IL w/1.0 $_{wt.}$ % $Al_2O_3$ 20° C./min | 450 | 434 |
| IL w/2.5 $_{wt.}$ % $Al_2O_3$ 10° C./min | 428 | 420 |
| IL w/2.5 $_{wt.}$ % $Al_2O_3$ 20° C./min | 439 | 431 |
| IL w/0.5 $_{wt.}$ % CB 10° C./min | 448 | 424 |
| IL w/0.5 $_{wt.}$ % CB 20° C./min | 461 | 446 |
| IL w/1.0 $_{wt.}$ % CB 10° C./min | 448 | 410 |
| IL w/1.0 $_{wt.}$ % CB 20° C./min | 465 | 439 |
| IL w/2.5 $_{wt.}$ % CB 10° C./min | 455 | 424 |
| IL w/2.5 $_{wt.}$ % CB 20° C./min | 468 | 449 |

Figure 1:
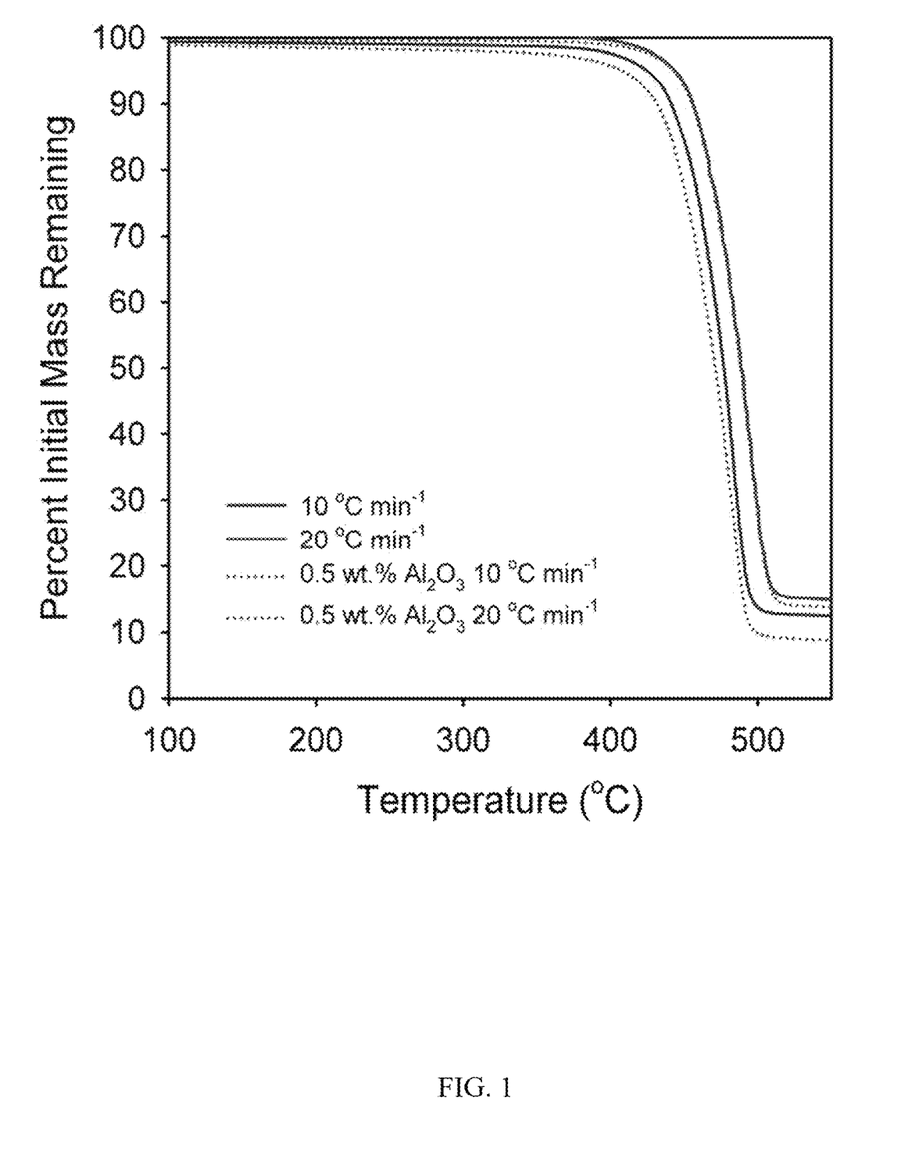
FIG. 1 provides a plot of thermal stability data for both a reference liquid and exemplary embodiments of nanoparticle enhanced ionic liquids (NEILs) as further described below.

Comparing the data it can be seen, for example, that the base ionic liquid with nanoparticles has a much higher thermal stability than the reference fluid, VP-1. Also, the addition of nanoparticles to the ionic liquid of [C4mmim][$NTf_2$] does not undermine thermal stability. This can be more readily observed from FIG. 1, which provides a plot of the percent initial mass of the sample remaining versus temperature for VP-1 (solid line) and 0.5 weight percent $Al_2O_3$ at two different heating rates.

Heat Capacity

Heat capacities of NEILs with nanoparticles of both CB and $Al_2O_3$ dispersed in the ionic liquid of [C4mmim][$NTf_2$] as previously described were measured using a Netzsch DSC 404 with a silver furnace between 40 to 400° C. The values for heat capacity were determined according to ASTM-E1269-05 (2005). All measurements were conducted at least five times for repeatability. The resulting measurements appear in Table II and were calculated with an error of 15 percent or less.

TABLE II

| | Density (g/mL) | | Specific Heat Capacity (J/g K) | | Volumetric Heat Capcity (J/mL K) | |
|---|---|---|---|---|---|---|
| Temperature (° C.) | 80 | 250 | 80 | 250 | 80 | 250 |
| VP-1 | 1.02 | 0.87 | 1.73 | 2.18 | 1.76 | 1.90 |
| IL | 1.37 | 1.29 | 1.53 | 1.84 | 2.10 | 2.37 |
| IL w/0.5 $_{wt.}$ % Al$_2$O$_3$ | 1.39 | 1.16 | 1.70 | 1.99 | 2.36 | 2.31 |
| IL w/1.0 $_{wt.}$ % Al$_2$O$_3$ | 1.43 | 1.20 | 1.93 | 2.35 | 2.75 | 2.82 |
| IL w/2.5 $_{wt.}$ % Al$_2$O$_3$ | 1.51 | 1.32 | 2.02 | 2.40 | 3.05 | 3.17 |
| IL w/0.5 $_{wt.}$ % CB | 1.39 | 1.26 | 1.34 | 1.40 | 1.86 | 1.76 |
| IL w/1.0 $_{wt.}$ % CB | 1.39 | 1.23 | 1.14 | 1.35 | 1.58 | 1.66 |
| IL w/2.5 $_{wt.}$ % CB | 1.23 | 1.21 | 1.09 | 1.28 | 1.34 | 1.55 |

As shown in Table II, the ionic liquid of [C4mmim][NTf$_2$] has a higher heat capacity than the reference fluid (Therminol VP-1). Creation of the NEILs through addition of the nanoparticles of Al$_2$O$_3$ to this ionic liquid significantly increases the heat capacity of the base ionic liquid. Also, the heat capacity of the NEILs is improved by increases in the weight percentage of nanoparticles of Al$_2$O$_3$. However, as also shown in Table II, the addition of CB nanoparticles has a deleterious effect on the heat capacity of the base ionic liquid that becomes worse as the weight percentage increases.

Figure 2:
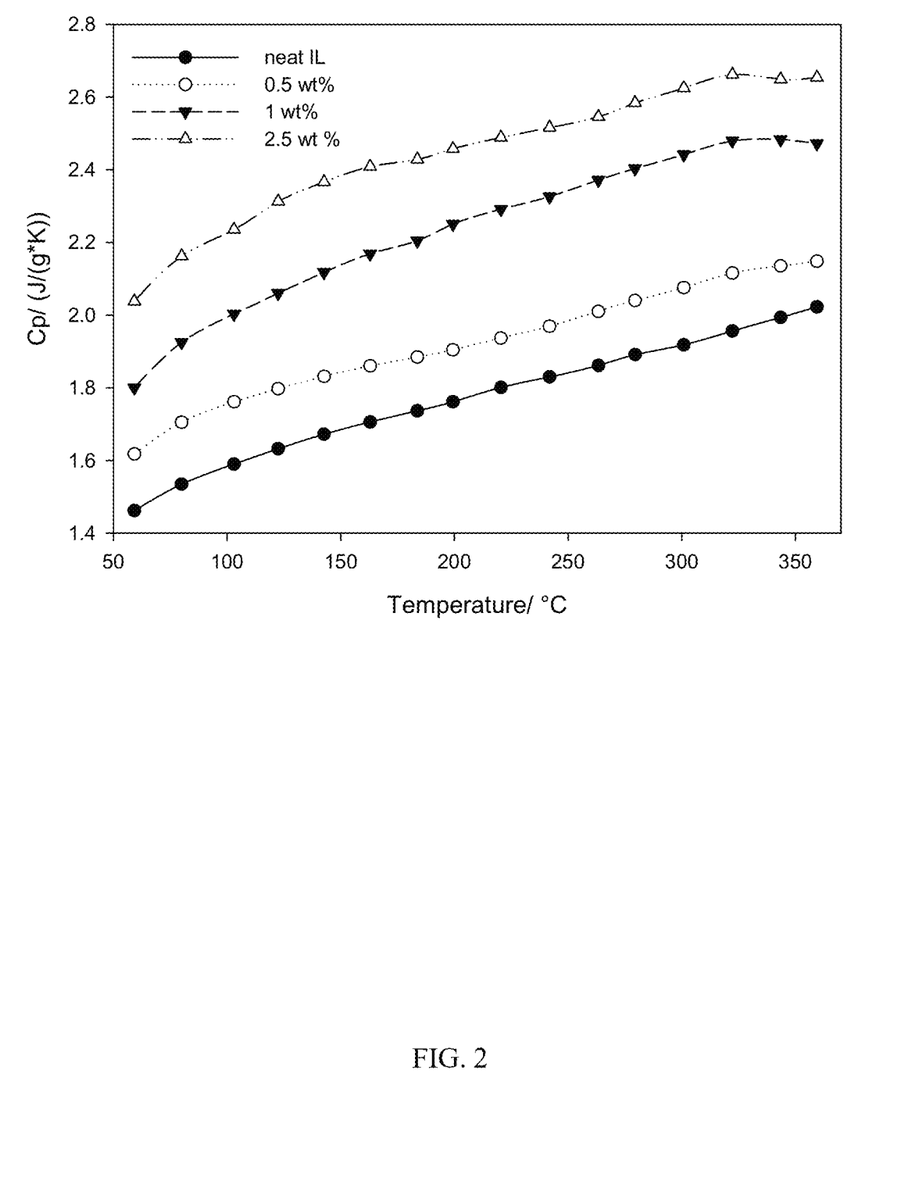
FIG. 2 is a plot of the specific heat capacity versus temperature for both a reference liquid and exemplary embodiments of NEILs.
Figure 3:
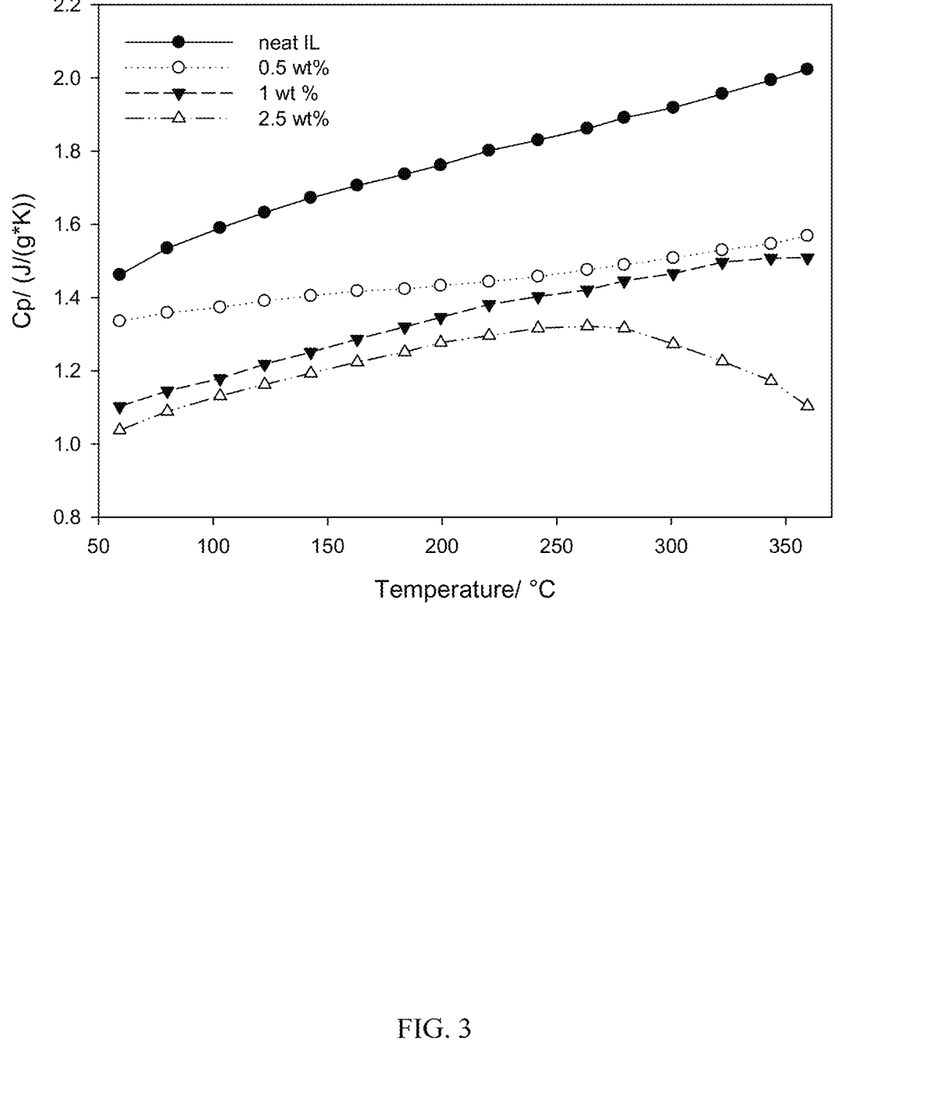
FIG. 3 is a plot of the specific heat capacity versus temperature for a reference liquid and various weight percentages of carbon black nanoparticles dispersed in an ionic liquid.

FIG. 2 provides a plot of the specific heat capacity versus temperature for the NEILs of Al$_2$O$_3$ nanoparticles dispersed into [C4mmim][NTf$_2$] at various weight percentages. In addition to the improvement in heat capacity with increasing weight percentage of nanoparticles, this plot also shows that the heat capacity also increased with temperature. FIG. 3 provides a plot of the specific heat capacity versus temperature for the NEILs of CB nanoparticles dispersed into [C4mmim][NTf$_2$] at various weight percentages. As stated above, a reduction in heat capacity occurred with the increasing weight percentage of CB nanoparticles.

Newtonian Flow

Figure 4:
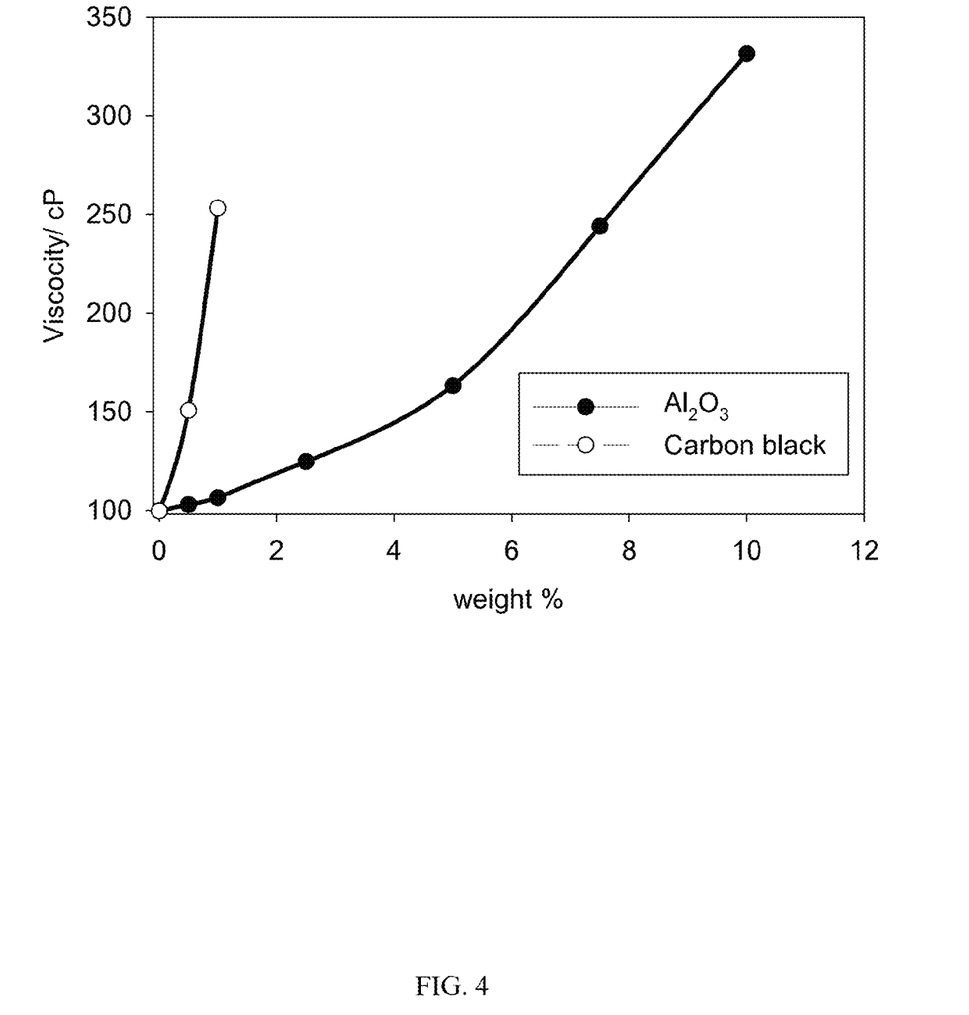

It is preferable that a heat transfer fluid exhibit Newtonian flow during use. Accordingly, NEILs of CB and Al$_2$O$_3$ nanoparticles that were dispersed into [C4mmim][NTf$_2$] at different weight percentages as previously described and the viscosities were measured at 25° C. according to ASTM-E1269-05 (2005) at 25° C. The results are plotted in FIG. 4. As shown, the identity of the nanoparticles had a large influence on the viscosity of the resulting NEILs. When CB was used, the viscosity increased 50% with the addition of only 0.5 wt % of material. At weight percents above 1%, the ionic liquid was completely absorbed by the CB; therefore, the viscosity was not measured. When Al$_2$O$_3$ was used, the viscosity changes were much more gradual. The viscosity increased by 6% with a 1 wt % addition, with much larger increases occurring at 2.5 wt % and above. Without intending to be bound by theory, it is believed that the differences in behavior of the NEILs are attributed to the different physical properties of the nanomaterials, as seen in Table II. More particularly, the larger surface area and pore volume enabled better absorption of the ionic liquid in the CB, which drastically affected the viscosity.

Additional Nanoparticles

Figure 5:
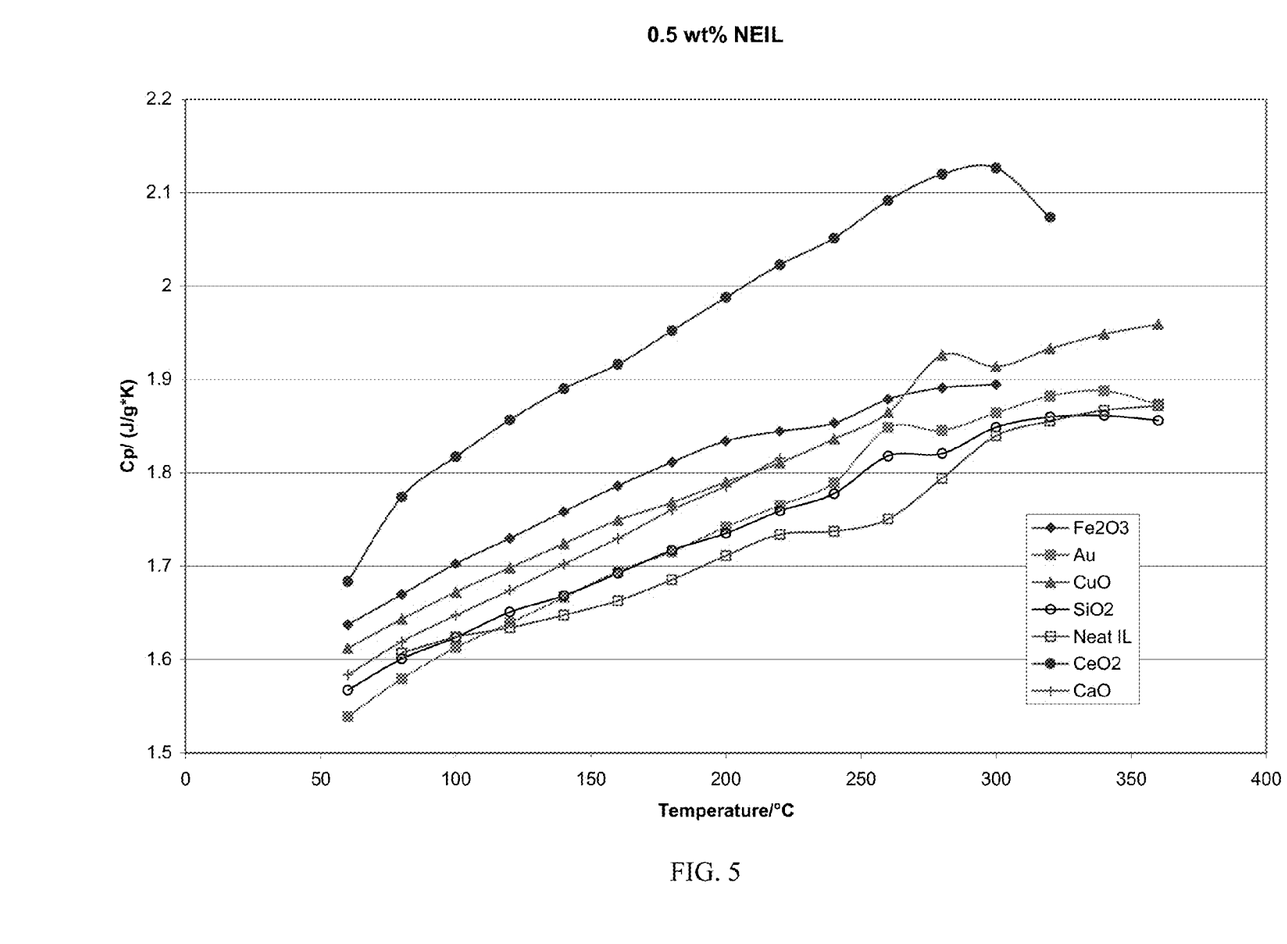

NEILs of 0.5 weight percent of nanoparticles of Fe2O3, Au, CuO, SiO2, CeO2, and CaO were each created as previously described by adding the weighed materials to the ionic liquid of [C4mmim][NTf$_2$] in a glass vial and shaking with a vortex mixer for 15 minutes at a medium-high setting. Each such nanoparticle tested had at least one dimension that was about 50 nm or less. The heat capacities of these NEILs were also measured using a Netzsch DSC 404 with a silver furnace between 40 to 400° C. and determined according to ASTM-E1269-05 (2005). FIG. 5 shows a plot of the specific heat capacity of these NEILs as well as the base ionic liquid (neat IL). As shown, the heat capacity of the base ionic liquid is increased by the addition of nanoparticles. The increase of the heat capacity of the based liquid and the NEILs appears to increase fairly linearly with temperature until about 250° C. By way of example, a NEILs of the present invention may have a specific heat capacity in the range of about 1.4 to 3.0 J/g K, or in the range of about 2.0 to 2.8 J/g K.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat transfer fluid, comprising:
   an ionic liquid comprising a cation having the following general formula:

wherein R$_n$ is an alkyl group of n carbon atoms and n is an integer ≥1; and
   nanoparticles dispersed in the ionic liquid, wherein the nanoparticles are made from one or more metals, inorganic metal oxides, or combinations thereof.

2. A heat transfer fluid as in claim 1, wherein n is an integer in the range of 1 to 6.

3. A heat transfer fluid as in claim 2, wherein the ionic liquid comprises a cation having the following general formula:

4. A heat transfer fluid as in claim 1, wherein the inorganic metal oxides are selected from the group consisting of alkali metal oxides, alkaline earth metal oxides, transition metal oxides, lanthanide oxides, and combinations thereof.

5. A heat transfer fluid as in claim 1, wherein the metals are selected from the group consisting of transition metals, noble metals, lanthanides, and combinations thereof.

6. A heat transfer fluid as in claim 1, wherein the nanoparticles comprise Al$_2$O$_3$.

7. A heat transfer fluid as in claim 1, wherein the nanoparticles are present in the ionic liquid at a weight percent of about 0.1 to 5 percent.

8. A heat transfer fluid, comprising:

an ionic liquid;

nanoparticles dispersed in the ionic liquid, wherein the nanoparticles are made from one or more metals, inorganic metal oxides, or combinations thereof, and wherein the ionic liquid comprises an anion having either of the following general formulas:

or

9. A heat transfer fluid in claim 8, wherein the inorganic metal oxides are selected from the group consisting of alkali metal oxides, alkaline earth metal oxides, transition metal oxides, lanthanide oxides, and combinations thereof.

10. A heat transfer fluid as in claim 8, wherein the metals are selected from the group consisting of transition metals, noble metals, lanthanides, and combinations thereof.

11. A heat transfer fluid as in claim 8, wherein nanoparticles comprise $Al_2O_3$.

12. A heat transfer fluid as in claim 8, wherein the nanoparticles are present in the ionic liquid at a weight percent of about 0.1 to 5 percent.

13. A heat transfer fluid, comprising:

an ionic liquid comprising a cation having the following general formula:

wherein $R_n$ is an alkyl group of n carbon atoms and n is an integer $\geq 1$; and nanoparticles dispersed in the ionic liquid, wherein the nanoparticles are made from one or more metals, inorganic metal oxides, or combinations thereof.

14. A heat transfer fluid as in claim 13, wherein n is an integer in the range of 1 to 6.

15. A heat transfer fluid as in claim 14, wherein the ionic liquid comprises a cation having the following general formula:

16. A heat transfer fluid as in claim 13, wherein the ionic liquid comprises an anion having either of the following general formulas:

or

17. A heat transfer fluid, comprising:

an ionic liquid comprising a cation selected from a quaternary ammonium compound where the nitrogen is bonded to at least one alkyl group; and nanoparticles dispersed in the ionic liquid, wherein the nanoparticles are made from one or more metals, inorganic metal oxides, or combinations thereof.

18. A heat transfer fluid as in claim 17, wherein the ionic liquid comprises a cation having the following general formula:

where $R_n$ is an alkyl group of n carbon atoms and n is an integer $\geq 1$, and $R_{h/R1}$ is either a hydrogen (H) or a methyl group ($CH_3$).

19. A heat transfer fluid as in claim 18, wherein n is an integer in the range of 1 to 6.

20. A heat transfer fluid as in claim 19, wherein the ionic liquid comprises a cation having the following general formula:

21. A heat transfer fluid as in claim 18, wherein the ionic liquid comprises a cation having the following general formula:

22. A heat transfer fluid as in claim 18, wherein the ionic liquid comprises an anion having either of the following general formulas:

or

-continued

* * * * *